United States Patent
Yang et al.

(10) Patent No.: US 9,780,651 B2
(45) Date of Patent: Oct. 3, 2017

(54) CONTROL CIRCUIT AND ASSOCIATED METHOD FOR SWITCHING CONVERTER

(71) Applicant: Chengdu Monolithic Power Systems Co., Ltd., Chengdu (CN)

(72) Inventors: Xiangyi Yang, Chengdu (CN); Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 143 days.

(21) Appl. No.: 14/881,097

(22) Filed: Oct. 12, 2015

(65) Prior Publication Data
US 2016/0105111 A1  Apr. 14, 2016

(30) Foreign Application Priority Data
Oct. 11, 2014 (CN) .......................... 2014 1 0532614

(51) Int. Cl.
*H02M 3/156* (2006.01)
*H02M 1/00* (2006.01)
*H02M 3/158* (2006.01)

(52) U.S. Cl.
CPC ......... *H02M 3/1563* (2013.01); *H02M 3/156* (2013.01); *H02M 3/158* (2013.01); *H02M 2001/0009* (2013.01); *H02M 2001/0032* (2013.01); *Y02B 70/16* (2013.01)

(58) Field of Classification Search
CPC ......... H02M 2001/0009; H02M 3/156; H02M 3/158
See application file for complete search history.

(56) References Cited

U.S. PATENT DOCUMENTS

| 8,836,310 B2 | 9/2014 | Li et al. | |
| 8,928,300 B2 | 1/2015 | Xi et al. | |
| 2006/0214647 A1* | 9/2006 | Ishimaru | H02M 3/1588 323/222 |
| 2008/0088292 A1* | 4/2008 | Stoichita | H02M 3/156 323/285 |
| 2008/0218133 A1* | 9/2008 | Kuan | H02M 3/156 323/234 |
| 2010/0134080 A1* | 6/2010 | Ouyang | H02M 3/158 323/282 |

* cited by examiner

*Primary Examiner* — Fred E Finch, III
*Assistant Examiner* — Rafael O De Leon Domenech
(74) *Attorney, Agent, or Firm* — Perkins Coie LLP

(57) ABSTRACT

A control circuit for switching converter has an ON signal generating circuit, an OFF signal generating circuit, a first comparator, a second comparator and a logic circuit. The switching converter has a high switch and a low side switch connected in series. The ON signal generating circuit provides an ON signal based on a reference signal and a feedback signal. The OFF signal generating circuit provides an OFF signal. The first comparator provides a first comparing signal based on a comparing result between a first threshold and a current through the high side switch. The second comparator provides a second comparing signal based on a comparing result between a second threshold and a current through the low side switch. The logic circuit provides a first switching signal to control the high side switch ON and OFF and a second switching signal to control the low side switch ON and OFF.

19 Claims, 5 Drawing Sheets

CONTROL CIRCUIT AND ASSOCIATED METHOD FOR SWITCHING CONVERTER

CROSS-REFERENCE TO RELATED APPLICATIONS

This application claims priority to and the benefit of Chinese Patent Application No. 201410532614.4, filed on Oct. 11, 2014, which is incorporated herein by reference in its entirety.

TECHNICAL FIELD

The present invention generally relates to electronic apparatuses, and more particularly but not exclusively to control circuit for switching mode power supply.

BACKGROUND

Switching converters are widely used due to their high efficiency and simple internal structure. Many control modes could be used to control switching converters, such as constant on time (COT) control mode, peak current control mode and average current control mode. Among these control modes, COT control mode is getting more and more popular as its fast transient response, simple structure and smooth switch of operation mode.

FIG. 1 schematically illustrates a prior art switching converter 1. The switching converter 10 comprises a control circuit 100 and a switching circuit 110. The switching circuit 110 adopts a synchronous buck topology, comprising a high side switch M1, a low side switch M2, an inductor L and an output capacitor C. The high side switch M1 has a first terminal configured to receive an input voltage VIN, a control terminal configured to receive a switching signal CTRL, and a second terminal. The low side switch has a first terminal coupled to the second terminal of the high side switch M1, a control terminal and a second terminal connected to ground. The inductor L has a first terminal connected to the second terminal of the high side switch M1 and a second terminal configured to provide an output voltage VOUT. The switching circuit 410 converts the input voltage VIN to the output voltage VOUT under the control of the switching signal CTRL.

The control circuit 100 comprises an ON signal generating circuit 101, an OFF signal generating circuit 102, a logic circuit 103 and a zero current protection comparator 104. The ON signal generating circuit 101 has a first input terminal, a second input terminal and an output terminal. Based on a comparing result between a reference signal VREF received at the first input terminal and the output voltage VOUT received at the second input terminal, the ON signal generating circuit 101 provides an ON signal SETON at the output terminal. The OFF signal generating circuit 102 provides an OFF signal SETOFF at the output terminal. The OFF signal generating circuit 102 begins timing when the high side switch M1 is turned on, and the OFF signal SETOFF jumps from a first status (e.g. logic low) to a second status (e.g. logic high) when a preset time TS ends. The logic circuit 103 has a first input terminal, a second input terminal and an output terminal. The logic circuit 103 provides the switching signal CTRL at the output terminal based on the ON signal SETON received at the first input terminal and the OFF signal SETOFF received at the second input terminal. Normally, the high side switch M1 is turned on when the ON signal SETON is enabled (e.g. jumping from a first status to a second status). The high side switch M1 is turned off when the OFF signal SETOFF is enabled (e.g. jumping from a first status to a second status).

Under light load conditions, the inductor current IL may fall below zero. As a result, a current would flow from the output capacitor C through the inductor L and the low side switch M2 into ground, thereby affecting the efficiency of the switching converter 10. So, the control circuit 100 further comprises a zero current protection comparator 104. The zero current protection comparator 104 compares a current through the low side switch M2 (low side switch current IM2) with a current threshold IZE, configured to turn off the low side switch M2 when the low side switch current IM2 falls down around the current threshold IZE, so as to avoid a large negative current through the low side switch M2. Setting the current threshold IZE is a difficult work. A small current threshold IZE may lead to a large negative current through the low side switch caused by time delay of the comparator 104 or rapid change of the current through the low side switch M2. A large current threshold IZE may lead to false triggering or no-triggering of the protection function of the comparator 104. For example, supposing that the current threshold IZE is set to around 200 mA, the threshold may be higher than the peak value of the inductor current IL under light load conditions. So, after the high side switch M1 is turned off, the zero current protection comparator 104 would turn off the low side switch M2 directly since the current through the low side switch is smaller than the current threshold IZE.

Designing control circuit with zero current protection function becomes a big challenge.

SUMMARY

Embodiments of the present invention are directed to a control circuit for a switching converter, the switching converter having a high switch and a low side switch connected in series, the control circuit comprising: an ON signal generating circuit having a first input terminal, a second input terminal and an output terminal, wherein the first input terminal is configured to receive a reference signal, and wherein the second input terminal is configured to receive a feedback signal which indicates an output voltage or a load current of the switching converter, and wherein based on a comparing result between the reference signal and the feedback signal, the ON signal generating circuit provides an ON signal at the output terminal; an OFF signal generating circuit, providing an OFF signal, wherein the OFF signal jumps from a first status to a second status when a preset time ends; a first comparator having a first input terminal, a second input terminal and an output terminal, wherein based on a comparing result between a first threshold and a current through the high side switch, the first comparator provides a first comparing signal at the output terminal; a second comparator having a first input terminal, a second input terminal and an output terminal, wherein based on a comparing result between a second threshold and a current through the low side switch, the second comparator provides a second comparing signal at the output terminal; and a logic circuit having a first input terminal, a second input terminal, a third input terminal, a fourth input terminal, a first output terminal and a second output terminal, wherein the first input terminal is configured to receive the ON signal, and wherein the second input terminal is configured to receive the OFF signal, and wherein the third input terminal is configured to receive the first comparing signal, and wherein the fourth input terminal is configured to receive the second comparing signal, and wherein based on the ON signal, the OFF signal, the first comparing signal and the second comparing signal, the logic circuit provides a first switching signal to control the high side switch ON and OFF and a second switching signal to control the low side switch ON and OFF, and wherein if the current through the high side switch is smaller than the first threshold when the preset time ends, the high side switch continues turning on till the current through the high side switch is equal to or larger than the first threshold.

Furthermore, there has been provided, in accordance with an embodiment of the present invention, a control method for a switching converter, the switching converter having a high switch and a low side switch connected in series, the control method comprising: turning on the high side switch; keeping the high side switch being turned on if a current through the high side switch is smaller than a first threshold when a preset time of the high side switch ends; turning off the high side switch and turning on the low side switch when the current through the high side switch rises up above the first threshold; and turning off the low side switch when a current through the low side switch falls down below a second threshold, wherein the second threshold is smaller than the first threshold.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
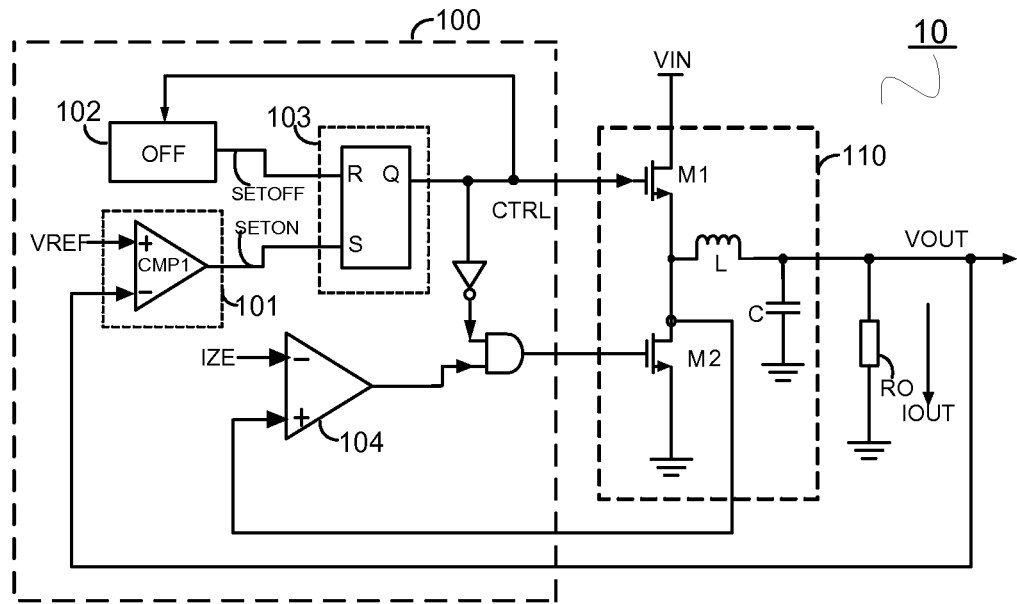
FIG. 1 schematically illustrates a prior art switching converter 10.
Figure 2:
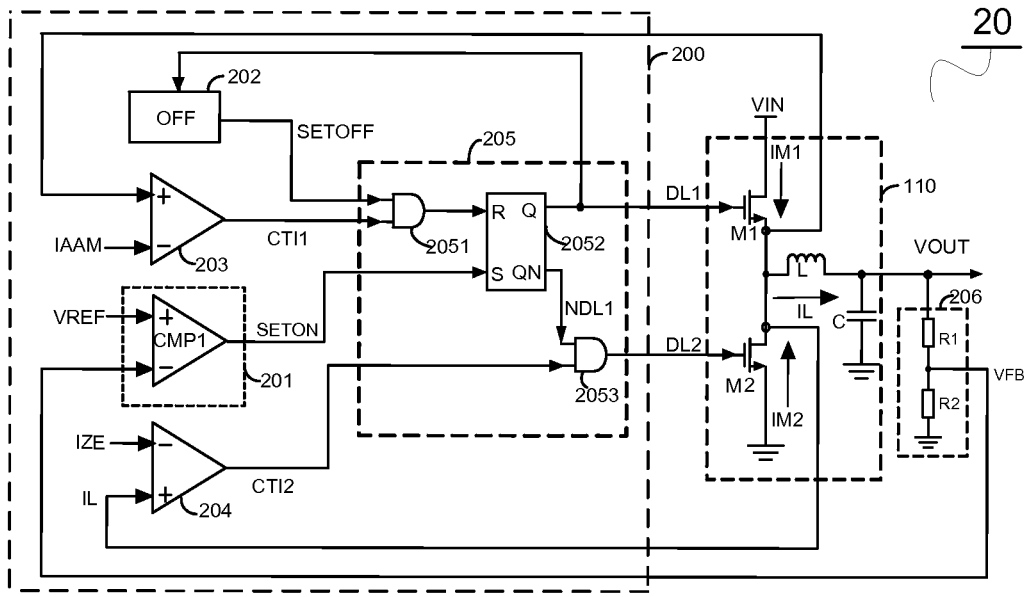
FIG. 2 schematically illustrates a switching converter 20 in accordance with an exemplary embodiment of the present invention.

FIG. 2 schematically illustrates a switching converter 20 in accordance with an embodiment of the present invention. The switching converter 20 comprises a control circuit 200 and the switching circuit 110. A first resister RF1 and a second resister RF2 are connected in series to sense the output voltage VOUT and provide a feedback voltage VFB. In another embodiment, the switching circuit 110 may apply many topologies, such as buck converter, boost converter, buck-boost converter, fly-back converter, and other switching converters that may adopt COT control.

The control circuit 200 comprises an ON signal generating circuit 201, an OFF signal generating circuit 202, a first comparator 203, a second comparator 204 and a logic circuit 205.

The ON signal generating circuit 201 has a first input terminal, a second input terminal and an output terminal. Based on a comparing result between a reference signal VREF received at the first input terminal and the feedback signal VFB received at the second input terminal, the ON signal generating circuit 201 provides an ON signal SETON at the output terminal. In another embodiment, the ON signal generating circuit 201 provides the ON signal SETON based on a comparing result between the reference signal VREF and a current feedback signal which indicates a load current IOUT of the switching converter 20. In an embodiment, the ON signal generating circuit 201 comprises a first voltage comparator COM1. The first voltage comparator COM1 has a first input terminal utilized as the first input terminal of the ON signal generating circuit 201, a second input terminal utilized as the second input terminal of the ON signal generating circuit 201 and an output terminal utilized as the output terminal of the ON signal generating circuit 201.

The OFF signal generating circuit 202 provides an OFF signal SETOFF, wherein the OFF signal SETOFF jumps from a first status to a second status when a preset time TS ends. In an embodiment, the preset time TS is a constant time. In another embodiment, the value of preset time TS is proportional to the value of input voltage VIN, the output voltage VOUT or the load current IOUT. In an embodiment, the OFF threshold generating circuit 202 comprises a timing circuit, wherein the timing circuit begins timing when the high side switch M1 is turned on, and stops timing when the preset time TS ends.

The first comparator 203 has a first input terminal, a second input terminal and an output terminal. Based on a comparing result between a first threshold IAAM and a current through the high side switch M1 (high side switch current IM1), the first comparator 203 provides a first comparing signal CTI1 at the output terminal.

The second comparator 204 has a first input terminal, a second input terminal and an output terminal. Based on a comparing result between a second threshold IZE and a current through the low side switch M2 (low side switch current IM2), the second comparator 204 provides a second comparing signal CTI2 at the output terminal.

The logic circuit 205 has a first input terminal, a second input terminal, a third input terminal, a fourth input terminal, a first output terminal and a second output terminal, wherein the first input terminal is configured to receive the ON signal SETON, and wherein the second input terminal is configured to receive the OFF signal SETOFF, and wherein the third input terminal is configured to receive the first comparing signal CTI1, and wherein the fourth input terminal is configured to receive the second comparing signal CTI2. Based on the ON signal SETON, the OFF signal SETOFF, the first comparing signal CTI1 and the second comparing signal CTI2, the logic circuit provides a first switching signal DL1 to control the high side switch M1 ON and OFF and a second switching signal DL2 to control the low side switch M2 ON and OFF, if the high side switch current IM1 is smaller than the first threshold IAAM when the preset time TS ends, the high side switch M1 continues turning on till the high side switch current IM1 rises above the first threshold IAAM. The low side switch M2 is turned on after the high side switch M1 is turned off, and the low side switch current IM2 begins to fall from the first current threshold IAAM. The second comparator 204 turns off the low side switch M2 when the current IM2 of the low side switch M2 falls down around the second threshold IZE. Since the first threshold IAAM is larger than the second threshold IZE, the switching converter 20 does not suffer from the false triggering issue or no-triggering issue as of the switching converter 10.

In one embodiment, the logic circuit 205 comprises a first logic circuit 2051, a flip-flop circuit 2052 and a second logic circuit 2053.

The first logic circuit 2051 has a first input terminal, a second input terminal and an output terminal, and wherein the first input terminal is configured to receive the OFF signal SETOFF, and wherein the second input terminal is configured to receive the first comparing signal CTI1. In one embodiment, the first logic circuit 2051 is an AND gate.

The flip-flop circuit 2052 has a first input terminal R, a second input terminal S, a first output terminal Q and a second output terminal QN, and wherein the first input terminal R is coupled to the output terminal of the first logic circuit 2051, and wherein the second input terminal is configured to receive the ON signal SETON, and wherein the first output terminal is configured to provide the first switching signal DL1, and wherein the second output terminal is configured to provide an invert switching signal NDL1. In one embodiment, the flip-flop circuit 2052 is a RS flip-flop.

The second logic circuit 2053 has a first input terminal, a second input terminal and an output terminal, and wherein the first input terminal is configured to receive the invert switching signal NDL1, and wherein the second input terminal is configured to receive the second comparing signal CTI2, and wherein the output terminal is configured to provide the second switching signal DL2. In one embodiment, the second logic circuit 2053 is an AND gate.

Figure 3:
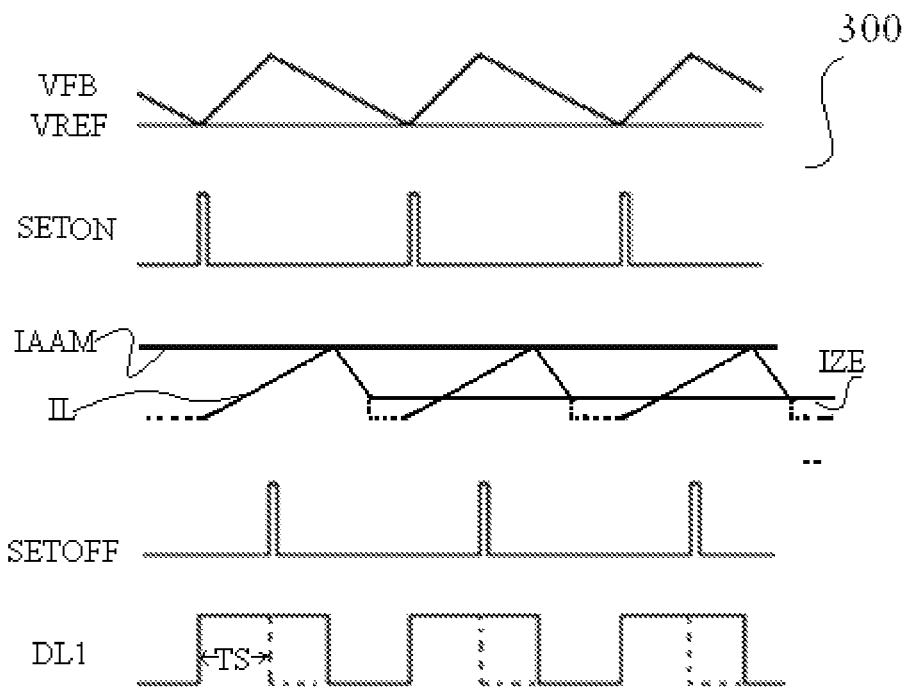
FIG. 3 illustrates an operational waveform 300 of the switching converter 20 in accordance with an exemplary embodiment of the present invention.

FIG. 3 illustrates an operational waveform 300 of the switching converter 20 in accordance with an embodiment of the present invention. When the feedback signal VFB becomes smaller than the reference signal VREF, the ON signal SETON jumps from logic low to logic high, and the first switching signal DL1 jumps to logical high to turn on the high side switch M1.

Once the high side switch M1 is turned on, the off signal generating circuit 202 begins timing, and the off signal SETOFF jumps from the first status to a second status when the preset time TS ends. When the preset time TS ends, since the high side switch current IM1 is smaller than the first threshold IAAM, the first comparing signal CTI1 keeps logic low. That is, the first comparing signal CTI1 blocks the off signal SETOFF. So, the output of the first logic 2051 keeps logic low and the high side switch continues turning on.

Once the high side switch current IM1 rises above the first threshold IAAM, the first comparing signal CTI1 jumps to logic high, and then the output of the first logic jumps to logic high, and then the first switching signal jumps to logic high, and then the high side switch M1 is turned off, and then the low side switch M2 is turned on.

Once the low side switch M2 is turned on, the low side switch current IM2 begins to fall. When the low side current IM2 falls down around the second current threshold IZE. The second comparing signal and the second switching signal jump to logic low, and then the low side switch would be turned off. Once the low side switch is turned off, the low side switch current IM2 is different from the inductor current IL, and thereof the inductor current IL after the low side switch M2 is turned off is shown by dashed line in FIG. 3.

Figure 4:
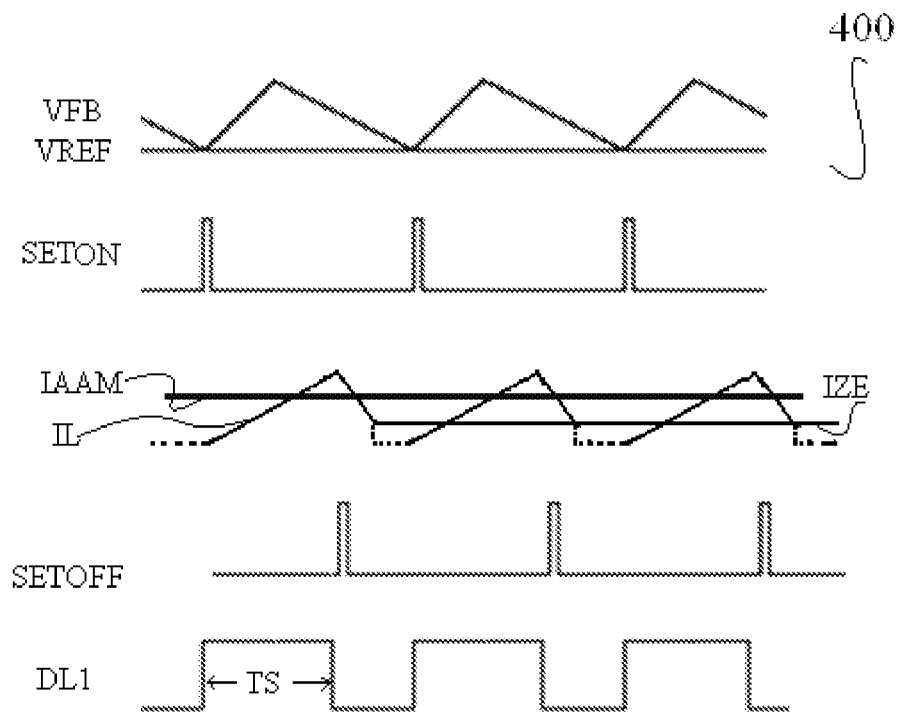
FIG. 4 illustrates an operational waveform 400 of the switching converter 20 in accordance with an exemplary embodiment of the present invention FIG. 5 schematically illustrates a switching converter 50 in accordance with an exemplary embodiment of the present invention.

According to an embodiment, if the high side switch current IM1 is equal to or larger than the first threshold IAAM at the end of the preset time TS, the first switching signal DL1 turns off the high side switch M1 immediately when the preset time TS ends. FIG. 4 illustrates an operational waveform 400 of the switching converter 20 in accordance with an embodiment of the present invention. When the feedback signal VFB becomes smaller than the reference signal VREF, the ON signal SETON jumps from logic low to logic high, and the first switching signal DL1 jump to logical high to turn on the high side switch M1.

Once the high side switch M1 is turned on, the high side current IM1 rises, and the first comparing signal CTI1 jumps from logic low to logic high when the highs side switch current IM1 rises above the first threshold IAAM. The off signal generating circuit 202 begins timing when the high side switch M1 is turned on, and the off signal SETOFF jumps from the first status to the second status when the preset time TS ends. Since the first comparing signal CTI1 has jumped to logic high before the preset time TS ends, the first switching signal jumps to logic high when the preset time TS ends, the high side switch M1 is turned off the low side switch M2 is turned on.

Once the low side switch M2 is turned on, the low side switch current IM2 begins to fall. When the low side current IM2 falls to the second current threshold IZE, the second comparing signal CTI2 and the second switching signal DL2 jump to logic low, and the low side switch would be turned off.

Figure 5:
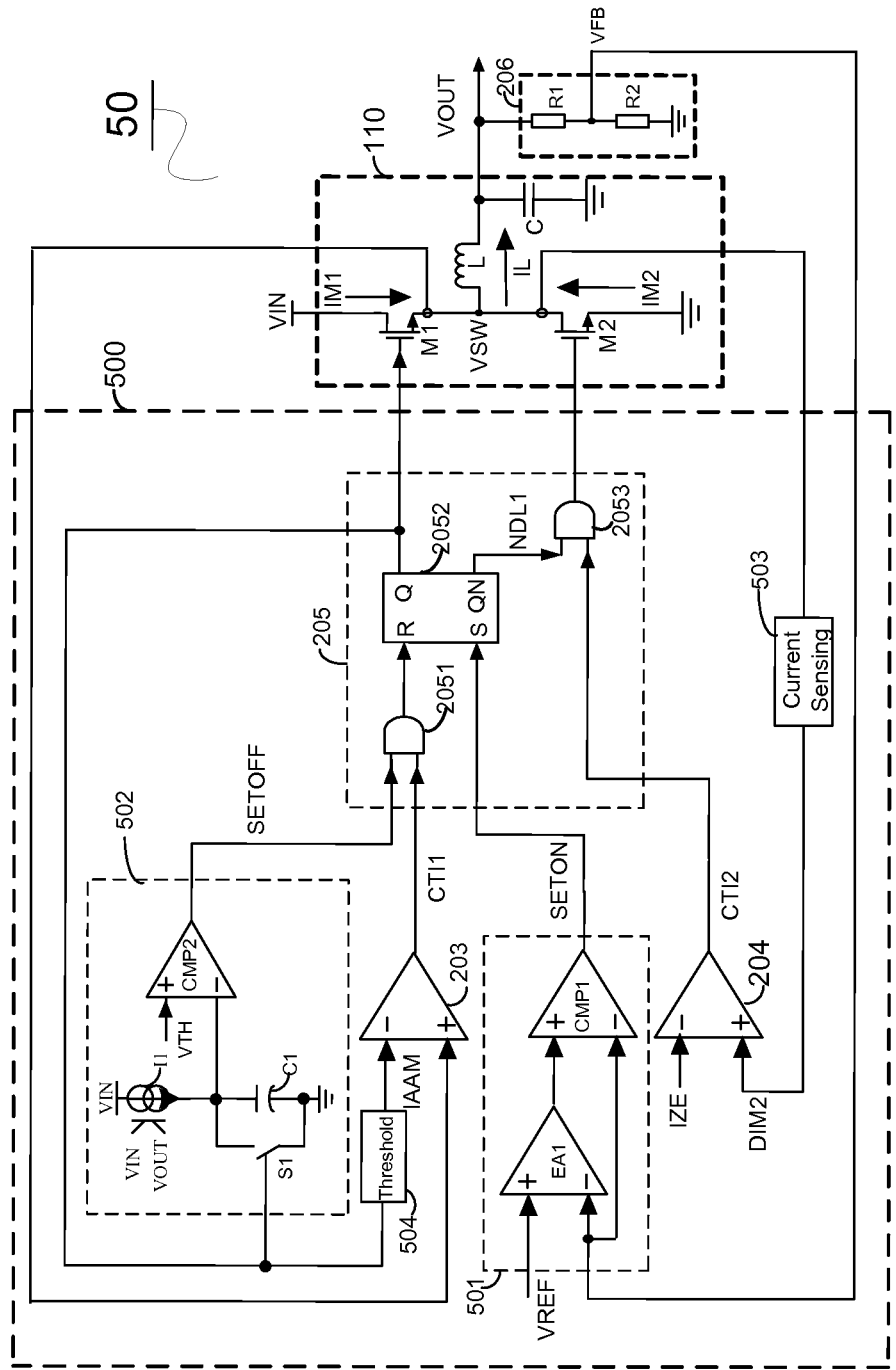

FIG. 5 schematically illustrates a switching mode power converter 50 in accordance with an embodiment of the present invention. The switching mode power converter 50 comprises a control circuit 500 and the switching circuit 110. In the control circuit 500, an ON signal generating circuit 501 is applied to replace the ON signal generating circuit 201 in the control circuit 200, an OFF signal generating circuit 502 is applied to replace the OFF signal generating circuit 202 in the control circuit 200, the control circuit 500 further comprises a current sensing (SC) circuit 503 and a threshold adjusting circuit 504.

The ON signal generating circuit 501 comprises a first amplifier EA1 and the first voltage comparator COM1. The first amplifier EA1 has a first input terminal, a second input terminal and an output terminal, wherein the first input terminal is utilized as the first input terminal of the ON signal generating circuit 501 for receiving the reference signal VREF, and wherein the second input terminal is utilized as the second input terminal of the ON signal generating circuit 501 for receiving the feedback signal VFB, and further wherein the output terminal is configured to provide an amplified error signal VEA. The first comparator COM1 has a first input terminal, a second input terminal and an output terminal, wherein the first input terminal of the first comparator COM1 is coupled to the output terminal of the first amplifier EA1, and wherein the second input terminal of the first comparator COM1 is coupled to the second input terminal of the first amplifier EA1, and further wherein the output terminal of the first comparator COM1 is utilized as the output terminal of the ON signal generating circuit 501. The first amplifier EA1 could greatly improve the performance of load regulation and line regulation of the converter 50.

The OFF signal generating circuit 502 comprises a first capacitor C1, a first switch S1, a first current source 11 and a second voltage comparator CM2. The first capacitor C1 has a first terminal and a second terminal, wherein the second terminal is connected to ground. The first switch S1 has a first terminal, a second terminal and a control terminal, wherein the first terminal is coupled to the first terminal of the first capacitor C1, and wherein the second terminal is connected to ground. The first current source 11 has a first terminal, a second terminal, wherein the first terminal receives the input voltage VIN, and wherein the second terminal is coupled to the first terminal of the first capacitor C1. The second voltage comparator CM2 has a first input terminal, a second input terminal and an output terminal, wherein the first input terminal is coupled to the first terminal of the first capacitor C1, and wherein the second input terminal is configured to receive a voltage threshold signal VTH, and wherein the output terminal provides the OFF signal SETOFF.

According to an embodiment, the first switch S1 is turned off when the high side switch M1 is turned on, and then the first current source 11 charges the first capacitor C1. The output signal of the second voltage comparator CM2 jumps from logic low to logic high when the voltage across the first capacitors C1 rises above the voltage threshold VTH. Assuming that a charging current generated by the first current source 11 is ICH, the preset time TS could be expressed as $$TS = \frac{VTH}{ICH} \quad (1)$$

Under heavy load, the preset time TS is equal to the on-time of the high side switch M1. According to working principle of a BUCK converter, the switching period TSW could be expressed as $$TSW = \frac{VIN}{IOUT} \times TS = \frac{VIN}{IOUT} \times \frac{VTH}{ICH} \quad (2)$$

According to equation (2), the switching cycle of the switching converter 50 remains constant if the value of charging current ICH is proportional to quotient (VIN/VOUT) between the input voltage VIN and the output voltage VOUT.

The current sensing circuit 503 has an input terminal and an output terminal. The current sensing circuit 503 provides the current sensing signal DIM2 based on the low side switch current IM2. In an embodiment, based on a comparing result between the second threshold IZE and the current sensing signal DIM2, the second comparator 204 provides the second comparing signal CTI2. In one embodiment, the current sensing circuit 503 is configured to detect a current flowing through the low side switch M2 directly. In another embodiment, the current sensing circuit 503 comprises a current simulating circuit configured to simulate a current flowing through the low side switch M2 by detecting a voltage on the first terminal of the low side switch M2 or a voltage difference between the first terminal and the second terminal of the low side switch M2.

In some embodiments, to avoid the device damage caused by an overlong on-time of the high side switch M1, the control circuit 500 further comprises a threshold adjusting circuit 504. The threshold adjusting circuit 504 has an input terminal configured to receive the first switching signal DL1 and an output terminal configured to provide the first threshold IAAM. The threshold adjusting circuit 504 reduces the first threshold IAAM if an on-time of the high side switch M1 is larger than a first on-time TON1. The decrement of the first threshold IAAM could be continually, or step by step such as a step of 50 mA for a 1 uS interval. In another embodiment, the input terminal of the threshold adjusting circuit 504 could be configured to receive the OFF signal SETOFF, configured to reduce the first threshold IAAM based on the OFF signal SETOFF. The first on-time could be several microsecond. Normally, the first on-time TON1 is longer than the preset time TS.

In some embodiments, to avoid the device damage caused by an overlong on-time of the high side switch M1, the high side switch M1 has a maximum on-time TMAX. In one embodiment, the threshold adjusting circuit 504 could be used as a maximum on-time circuit for setting the maximum on-time TMAX. Threshold adjusting circuit 504 reduces the first threshold IAAM to around zero if an on-time of the high side switch M1 is larger than the maximum on-time TMAX, then the output of the first logic jumps to logic high. Afterwards, the first switching signal jumps to logic high, and then the high side switch M1 is turned off and the low side switch M2 is turned on.

Figure 6:
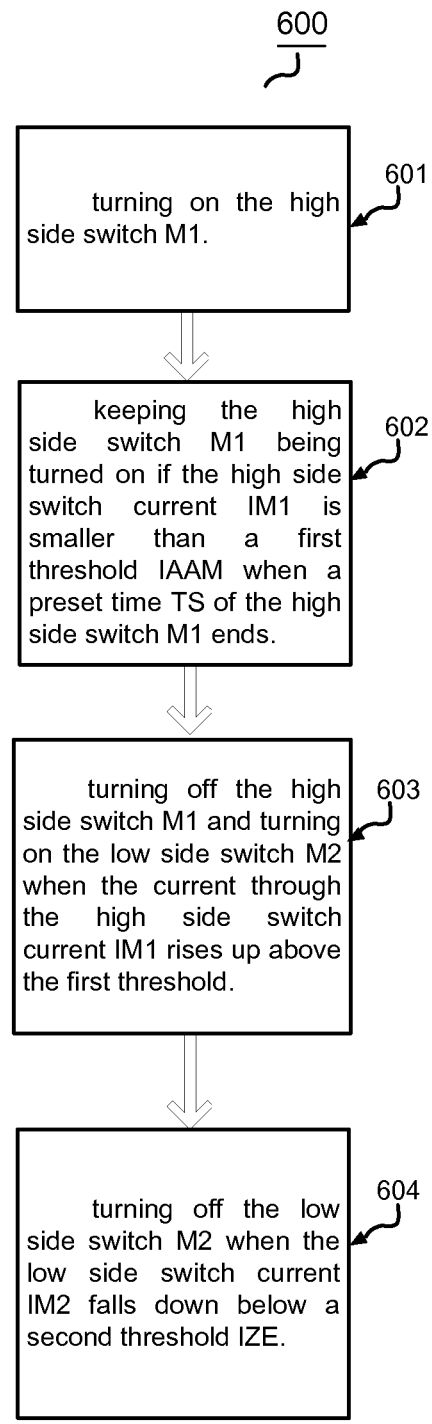
FIG. 6 illustrates a flow diagram 600 of a method for controlling a power converter in accordance with an exemplary embodiment of the present invention.

FIG. 6 illustrates a flow diagram 600 of a method for controlling a power converter in accordance with an exemplary embodiment of the present invention. The control method could be used to control the switching converter 20 or 50, comprising step 601, 602, 603 and 604. At step 601, turning on the high side switch M1; at step 602, keeping the high side switch M1 being turned on if the high side switch current IM1 is smaller than a first threshold IAAM when a preset time TS of the high side switch M1 ends; at step 603, turning off the high side switch M1 and turning on the low side switch M2 when the current through the high side switch current IM1 rises up above the first threshold IAAM; at step 604, turning off the low side switch M2 when the low side switch current IM2 falls down below a second threshold IZE, wherein the second threshold IZE is smaller than the first threshold IAAM.

Figure 7:
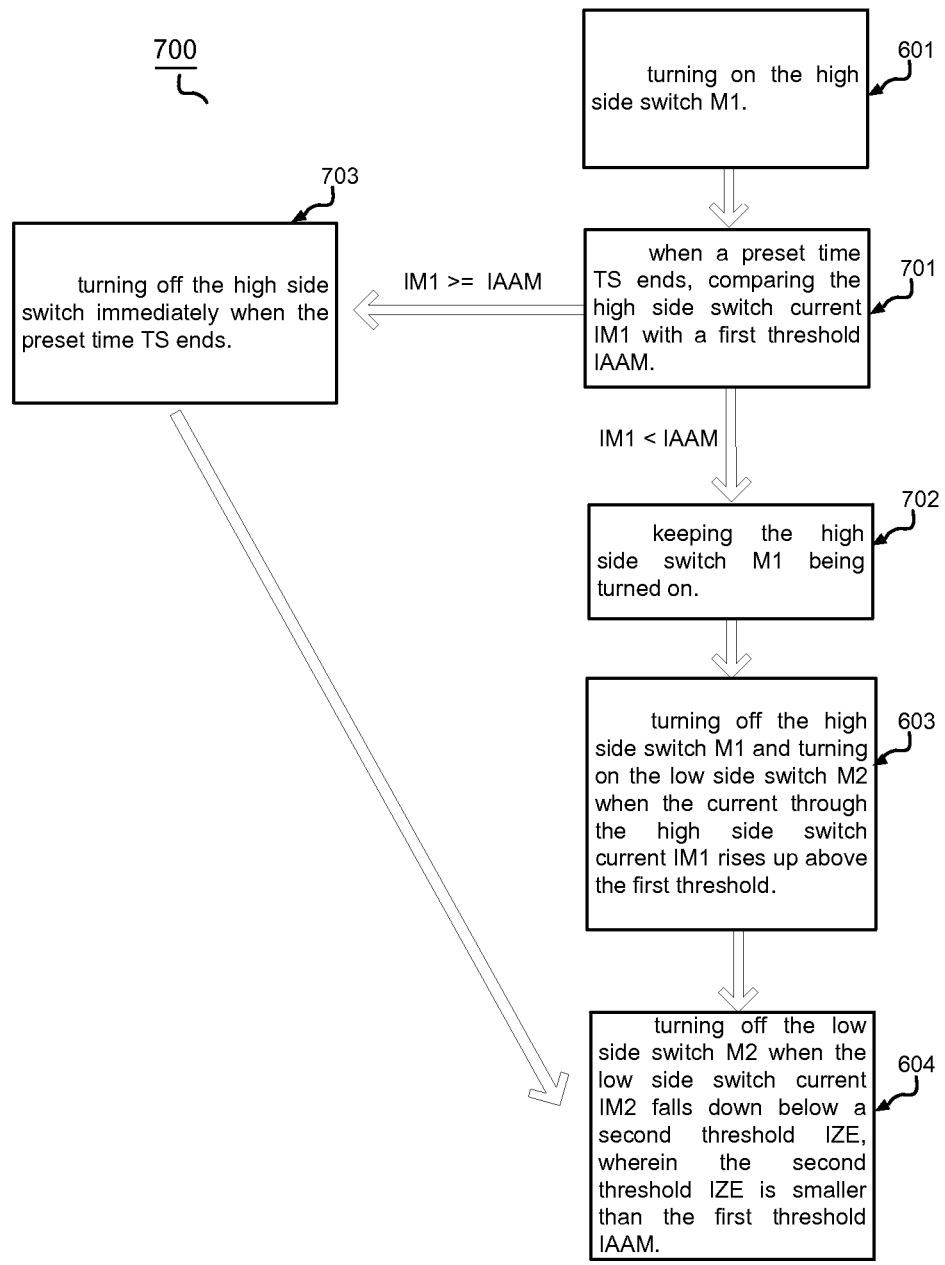
FIG. 7 illustrates a flow diagram 700 of a method for controlling a power converter in accordance with an exemplary embodiment of the present invention.

FIG. 7 illustrates a flow diagram 700 of a method for controlling a power converter in accordance with an exemplary embodiment of the present invention. The control method could be used to control the switching converter 20 or 50, comprising step 601, 701, 702, 703, 603 and 604. At step 701, comparing the high side switch current IM1 with a first threshold IAAM when a preset time TS ends, if the high side switch current IM1 is equal to or larger than the first threshold, executing step 703, turning off the high side switch immediately; if the high side switch current IM1 is smaller than a first threshold IAAM, executing step 702, keeping the high side switch M1 being turned on.

According to an embodiment of the present invention, the value of preset time TS is proportional to quotient (VIN/VOUT) between the input voltage VIN and the output voltage VOUT of the switching converter 50.

According to an embodiment of the present invention, the control method further comprising: reducing the first threshold IAAM if an on-time of the high side switch M1 is larger than a first on-time TON1.

According to an embodiment of the present invention, the high side switch M1 has a maximum on-time TMAX.

Control circuits and associate methods for switching converter have been disclosed. While specific embodiments of the present invention have been provided in the above description, it should be understood that these embodiments are for illustration purposes and not intend to limit the present invention. Many additional embodiments will be apparent to persons of ordinary skill in the art under the spirit of the present invention.

What is claimed is:

1. A control circuit for a switching converter, the switching converter having a high switch and a low side switch connected in series, the control circuit comprising:
    an ON signal generating circuit having a first input terminal, a second input terminal and an output terminal, wherein the first input terminal is configured to receive a reference signal, and wherein the second input terminal is configured to receive a feedback signal which indicates an output voltage or a load current of the switching converter, and wherein based on a comparing result between the reference signal and the feedback signal, the ON signal generating circuit provides an ON signal at the output terminal;
    an OFF signal generating circuit, providing an OFF signal, wherein the OFF signal jumps from a first status to a second status when a preset time ends;
    a first comparator having a first input terminal, a second input terminal and an output terminal, wherein based on a comparing result between a first threshold and a current through the high side switch, the first comparator provides a first comparing signal at the output terminal;
    a second comparator having a first input terminal, a second input terminal and an output terminal, wherein based on a comparing result between a second threshold and a current through the low side switch, the second comparator provides a second comparing signal at the output terminal; and
    a logic circuit having a first input terminal, a second input terminal, a third input terminal, a fourth input terminal, a first output terminal and a second output terminal, wherein the first input terminal is configured to receive the ON signal, and wherein the second input terminal is configured to receive the OFF signal, and wherein the third input terminal is configured to receive the first comparing signal, and wherein the fourth input terminal is configured to receive the second comparing signal, and wherein based on the ON signal, the OFF signal, the first comparing signal and the second comparing signal, the logic circuit provides a first switching signal to control the high side switch ON and OFF and a second switching signal to control the low side switch ON and OFF, and wherein if the current through the high side switch is smaller than the first threshold when the preset time ends, the high side switch continues turning on till the current through the high side switch is equal to or larger than the first threshold;
    wherein the ON signal generating circuit comprises:
        a first amplifier having a first input terminal, a second input terminal and an output terminal, and wherein the first input terminal is utilized as the first input terminal of the ON signal generating circuit, and wherein the second input terminal is utilized as the second input terminal of the ON signal generating circuit; and
        a first voltage comparator having a first input terminal, a second input terminal and an output terminal, and wherein the first input terminal is coupled to the output terminal of the first amplifier, and wherein the second input terminal is coupled to the second input terminal of the first amplifier, and wherein the output terminal is utilized as the output terminal of the ON signal generating circuit.

2. The control circuit according to claim 1, wherein if the current through the high side switch is smaller than the first threshold when the preset time ends, the first comparing signal blocks the OFF signal or the first switching signal to make the high side switch continue turning on.

3. The control circuit according to claim 1, wherein if the OFF signal is under the first status, the high side switch keeps being turned on; if the OFF signal is under the second status, the high side is turned off when the current through the high side switch rises above the first threshold.

4. The control circuit according to claim 1, wherein if the current through the high side switch is equal to or larger than the first threshold at the end of the preset time, the first switching signal turns off the high side switch when the preset time ends.

5. The control circuit according to claim 4, wherein
    the first comparing signal is under a first status if the current through the high side switch is smaller than the first threshold; and wherein
    the first comparing signal is under a second status if the current through the high side switch is larger than the first threshold; and wherein
    during the preset time, if the first comparing signal is under the second status, the high side switch is turned off when the OFF signal jumps from the first status to the second status.

6. The control circuit according to claim 1, wherein
    the high side switch has a first terminal, a control terminal and a second terminal, and wherein the first terminal is configured to receive an input voltage, and wherein the control terminal is configured to receive the first switching signal; and wherein
    the low side switch having a first terminal, a control terminal and a second terminal, wherein the first terminal is coupled to the second terminal of the high side switch, and wherein the control terminal is configured to receive the second switching signal, and wherein the second terminal is connected to ground; and wherein the switching converter further comprises:
        an inductor having a first terminal and a second terminal, wherein the first terminal is coupled to the second terminal of the high side switch, and wherein the second terminal is configured to provide an output voltage; and
        an output capacitor having a first terminal and a second terminal, wherein the first terminal is coupled to the second terminal of the inductor, and wherein the second terminal is coupled to ground.

7. The control circuit according to claim 1, wherein the OFF signal generating circuit comprises a timing circuit, wherein the timing circuit begins timing when the high side switch is turned on.

8. The control circuit according to claim 1, wherein the OFF signal generating circuit comprises:
    a first capacitor having a first terminal and a second terminal, wherein the second terminal is connected to ground;
    a first switch having a first terminal, a second terminal and a control terminal, wherein the first terminal is coupled to the first terminal of the first capacitor, and wherein the second terminal is connected to ground;
    a first current source having a first terminal, a second terminal, wherein the first terminal receives an input voltage of the switching converter, and wherein the second terminal is coupled to the first terminal of the first capacitor; and a second voltage comparator having a first input terminal, a second input terminal and an output terminal, and wherein the first input terminal is coupled to the first terminal of the first capacitor, and wherein the second input terminal is configured to receive a voltage threshold signal, and wherein the output terminal provides the OFF signal.

9. The control circuit according to claim 8, wherein a current generated from the first current source is proportional to the input voltage.

10. The control circuit according to claim 1, wherein the control circuit further comprises a threshold adjusting circuit, and wherein the threshold adjusting circuit reduces the first threshold if an on-time of the high side switch is longer than a first on-time.

11. The control circuit according to claim 1, wherein the control circuit further comprises a maximum on-time setting circuit, wherein the maximum on-time setting circuit is configured to turn off the high side switch when the on-time of the high side switch is longer than the maximum on-time.

12. The control circuit of claim 1, wherein the logic circuit comprises:

a first logic circuit having a first input terminal, a second input terminal and an output terminal, and wherein the first input terminal is configured to receive the OFF signal, and wherein the second input terminal is configured to receive the first comparing signal;

a flip-flop circuit having a first input terminal, a second input terminal, a first output terminal and a second output terminal, and wherein the first input terminal is coupled to the output terminal of the first logic circuit, and wherein the second input terminal is configured to receive the ON signal, and wherein the first output terminal is configured to provide the first switching signal, and wherein the second output terminal is configured to provide an invert switching signal; and a second logic circuit having a first input terminal, a second input terminal and an output terminal, and wherein the first input terminal is configured to receive the invert switching signal, and wherein the second input terminal is configured to receive the second comparing signal, and wherein the output terminal is configured to provide the second switching signal.

13. The control circuit according to claim 12, wherein the first logic circuit is an AND gate, and wherein the flip-flop circuit is a RS flip-flop, and wherein the second logic circuit is an AND gate.

14. A control method for a switching converter, the switching converter having a high switch and a low side switch connected in series, the control method comprising:

turning on the high side switch;

keeping the high side switch being turned on if a current through the high side switch is smaller than a first threshold when a preset time of the high side switch ends;

turning off the high side switch and turning on the low side switch when the current through the high side switch rises up above the first threshold; and turning off the low side switch when a current through the low side switch falls down below a second threshold, wherein the second threshold is smaller than the first threshold;

wherein the high side switch is turned on based on a comparison result of a feedback signal indicative of an output voltage of the switching converter and an amplified error signal generated by amplifying an error between a reference signal and the feedback signal.

15. The control circuit according to claim 14, further comprising: when the preset time ends, turning off the high side switch immediately if the current through the high side switch is equal to or larger than the first threshold.

16. The control method according to claim 14, wherein the preset time is proportional to quotient between the input voltage and the output voltage of the switching converter.

17. The control method according to claim 14, further comprising: reducing the first threshold if an on-time of the high side switch is longer than a first on-time.

18. The control method according to claim 14, wherein the high side switch has a maximum on-time.

19. The control method according to claim 14, wherein the switching converter is configured into a COT buck converter.

* * * * *